Figure 1:
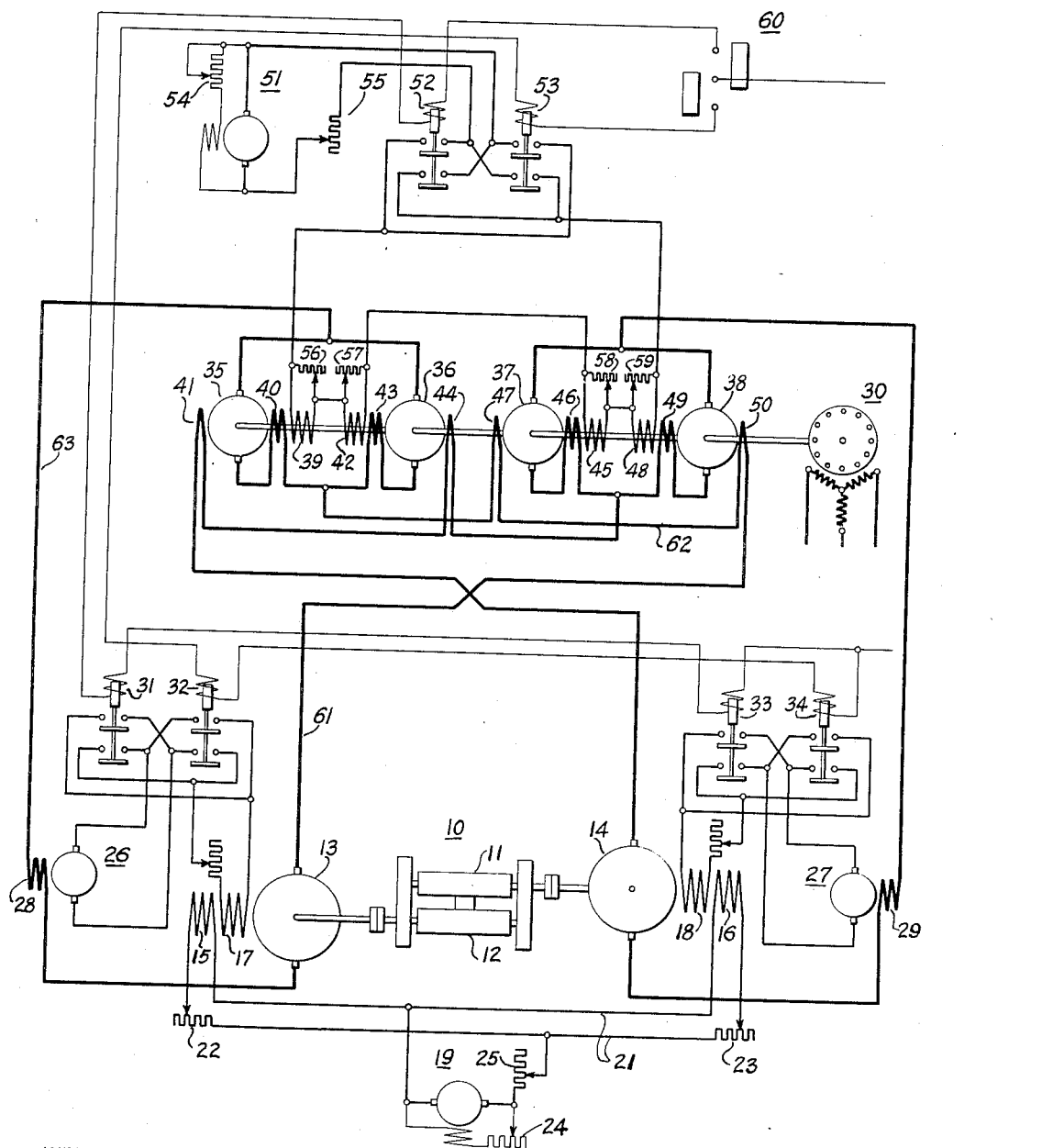

Feb. 9, 1937. H. E. STOKES 2,070,323
ELECTRICAL DRIVE SYSTEM
Filed Feb. 14, 1934 2 Sheets-Sheet 1

WITNESSES:
Leon J. Jaza
Wm. C. Groome

INVENTOR
Harold E. Stokes.
BY
Crawford
ATTORNEY

Patented Feb. 9, 1937

2,070,323

UNITED STATES PATENT OFFICE 2,070,323

ELECTRICAL DRIVE SYSTEM

Harold E. Stokes, Murraysville, Pa., assignor to Westinghouse Electric & Manufacturing Company, East Pittsburgh, Pa., a corporation of Pennsylvania Application February 14, 1934, Serial No. 711,158

7 Claims. (Cl. 172—239)

My invention relates, generally, to electrical drive systems, and more particularly to electrical systems suitable for driving separate loads, such, for example, as the separate work elements of a machine which may or may not co-operate to perform a single function or for driving a common load.

In the operation of various forms of machinery, such as rolling mills, hoists and the like, it is desirable and sometimes necessary to use separate driving motors to actuate the co-operating roll members, in the case of a rolling mill or to operate the hoist drums in a double drum hoisting system, either together as a unit or separately as two units.

The electrical drives which are now available for such applications have been found to be unsatisfactory in various ways because of the fact that they cannot be made to function properly to maintain the desired load division between the generators of the system or to maintain the desired load and speed ratios between the motors without resorting to the use of more or less expensive equipment of somewhat complicated design.

It has been the usual practice, heretofore, in the use of electrical drives of this kind, to operate the generators and motors in parallel and separately control the load division between the generators and the load division and speed relation of the motors by suitable equipment or field connections associated with both the generators and the motors. While systems of this kind may be designed to function with accuracy and with a relatively high efficiency, they have limitations as to capacity, are somewhat complicated in design and therefore expensive to build and are inflexible in operation.

It has been found in connection with the prior systems that where high capacity is desired, it is difficult if not impossible to increase the number of parallel connected generators to obtain such capacity without going to considerable expense for additional load regulating or balancing equipment and possibly decreasing the reliability of the drive.

Such systems or drives are also inflexible in operation, since the generators and motors are connected in parallel and operate as a unit when oftentimes it is advantageous to be able to operate only one generator or set of generators and motor separately in order to operate or adjust one work element of a machine.

It is, therefore, the object of my invention to provide an electrical drive which is simple, efficient and economical in operation which may be readily manufactured and installed.

A more specific object of my invention is to provide an electrical system wherein predetermined load and speed ratios are maintained between the motors and a predetermined load ratio maintained between the generators by controlling the excitation of the generators only.

Another object of my invention is to provide an electrical drive of such nature that the capacity of the drive may be greatly increased over that of electrical drives which have been used heretofore.

A further object of my invention is to provide an electrical drive comprising a plurality of interconnected groups of power elements which may be readily operated as individual groups if desired.

A still further object of my invention is to provide an electrical drive which has an inherent quick response to deviations from the predetermined speed and load ratios between the motors to maintain the speed and load ratios substantially constant at all times.

Figure 2:
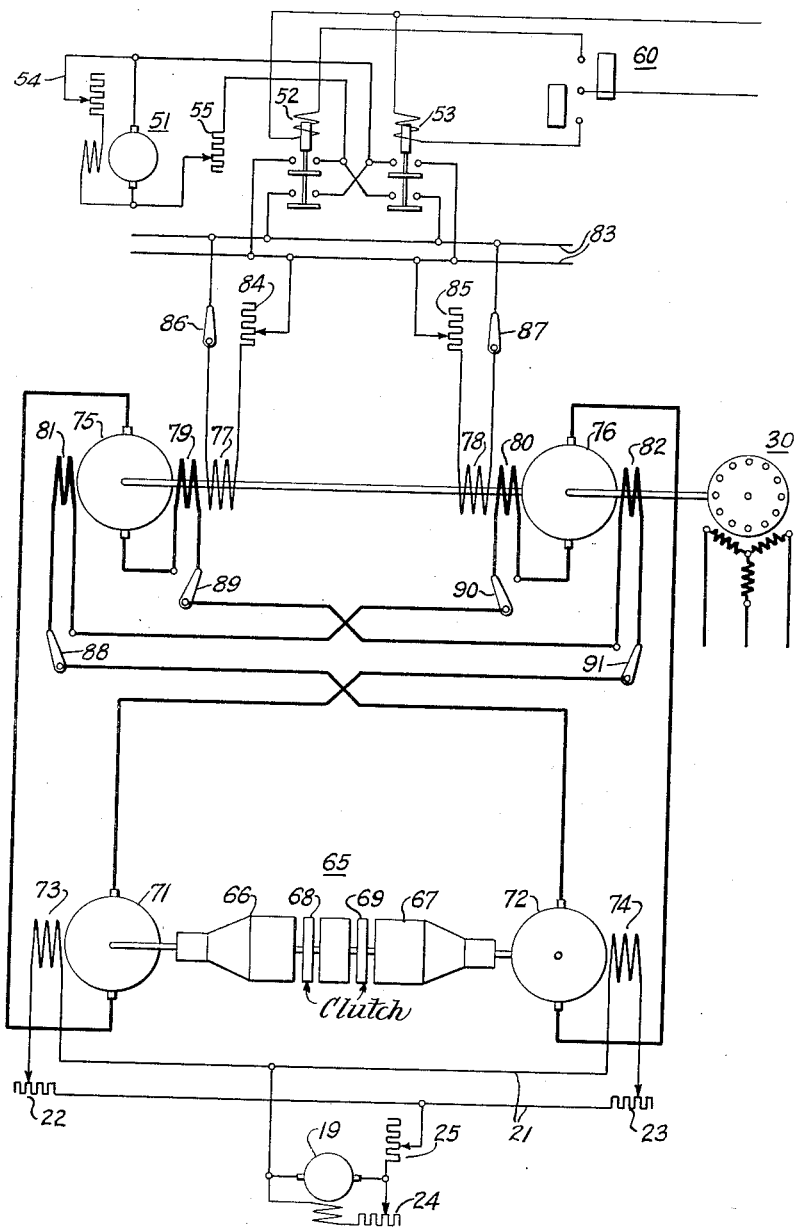

Other objects of my invention will become apparent and these objects may be more readily understood when reference is had to the accompanying drawings in which:

Figure 1 is a diagrammatic view of an electrical drive embodying the principal objects of my invention showing how it may be utilized to operate a rolling mill and, Fig. 2 is a diagrammatic view of a modification of the drive of Fig. 1, but embodying the same basic principles illustrating its adaptability for application to hoists and similar equipment.

In practicing my invention in its most elementary form, I provide a plurality of groups of dynamo-electric machines each group comprising one or more generators connected to supply variable voltage power to a motor connected with another motor to drive a common load or to drive separate units or work elements of a machine and interconnect the groups through certain of the regulating series windings on the generators so that the load currents of the motors are effective to maintain a predetermined load division between the generators and also a predetermined load division and speed ratio between the motors. The simplest form of connections to effectively practice my inventions is in the case where reversing service is not desired, however, it is to be understood that the principles of the invention may be readily applied to any system either reversing or non-reversing in character as will become evident from the description which follows.

Referring now to the drawings, there is illustrated in Fig. 1 an electric drive system embodying the principal features of my invention which is suitable for application to a rolling mill or other work device having separately driven work elements which cooperate in producing some result. It is to be understood that this is only a specific illustration of one of its uses as it may be applied to any load which requires more than a single motor to drive it.

As shown, the rolling mill 10 is provided with cooperating roll elements 11 and 12 which are individually driven by motors 13 and 14. In this instance, the motors are provided with separately-excited main field windings 15 and 16 and compounding field windings 17 and 18, respectively. The main field windings may be energized from any suitable source of current such, for example, as an exciter 19 connected to bus bars 21 to which the field windings are connected in parallel through suitable rheostats 22 and 23. Simultaneous adjustment of the excitation of these windings may be effected by varying the exciter voltage by means of a field rheostat 24 or by varying the voltage impressed upon the bus bars by means of a rheostat 25.

In order that the system may be suitable for reversing service, the compounding field windings 17 and 18 are energized by means of series exciters 26 and 27 having their field windings 28 and 29 connected in series circuit relation with the armatures of their respective motors thereby to energize these field windings in accordance with the motor loads in a well known manner. In order to provide for reversing the direction of flow of current in the compounding field windings each time the motors are reversed, a plurality of reversing switches 31, 32, 33 and 34 are utilized for connecting the field windings to the series exciter in opposite directions in a well known manner.

The motors 13 and 14 are supplied with variable voltage power from a plurality of generators 35 to 38 inclusive, which may be driven through a common shaft by a single motor 30. Since the motor 30 or the control features thereof form no part of the present invention, it has been deemed unnecessary to describe it further.

In this instance and for a purpose which will become apparent hereinafter, each generator is provided with a separately-excited main field winding, a differential series field winding and a cumulative series field winding; generator 35 having main field windings 39, a differential field winding 40 and a cumulative field winding 41; generator 36 having a main field winding 42, differential field winding 43, and a cumulative field winding 44; generator 37 having a main field winding 45, a differential field winding 46 and a cumulative field winding 47 and generator 38 having main field winding 48, a differential field winding 49 and a cumulative field winding 50.

The main field windings of the generators may be energized from any suitable source, such, for example, as an exciter 51 connected to the main field windings in series through reversing switches 52 and 53. As will be readily understood, the reversing switches provide for reversing the direction of generator voltage and consequently the direction of rotation of the motors. The degree of excitation of the main field windings may be controlled by varying the voltage of the exciter 51 by means of a field rheostat 54 or by means of rheostat 55 connected in series with the field windings. The energization of the main field windings may be individually varied by means of rheostats 56 to 59, inclusive.

The operation of reversing switches 31 to 34, 52 and 53 may be controlled by means of a suitable controller 60 which may be separately operated or operated in conjunction with any other controller of the electric drive system.

It will be readily understood that in the operation of an electric drive of this general type, which is utilized to operate separate but cooperating work elements of a mill, provision must be made for accurately maintaining a predetermined speed and load relationship between the motors, as well as a predetermined load relation between the generators supplying power thereto. Heretofore, it has been the usual practice to utilize special load balancing equipment in connection with the motors and also in connection with the generators in order to obtain this result.

In this instance, however, this result may be obtained without the use of this special equipment and by the use of a very simple system of connections between the motors and generators whereby separate groups of motors and generators are established, there being no interconnection between the groups other than through certain of the field windings which maintain a predetermined speed ratio and load balance on the motors as well as a predetermined load balance on the generators, as will be described more in detail hereinafter.

As shown, the motor 13 is supplied with power from generators 35 and 36 through a loop circuit which extends from one terminal of the motor 13 through conductor 61, cumulative field winding 50 of the generator 38, conductor 62, cumulative field winding 47 of the generator 37, through the parallel connected armatures and differential field windings 40 and 43 of generators 35 and 36, conductor 63, and field winding 28 of the series exciter 26 to the other terminal of motor 13.

The motor 14 is likewise connected in loop circuit relation with generators 37 and 38, the loop circuit in this instance including the cumulative series field windings 41 and 44 of generators 35 and 36, the other connections being exactly the same as described in connection with the motor 13.

In view of the foregoing, it is apparent that should the motor 14, for example, tend to take more than its proportionate share of the common load, the field excitation of the generators 35 and 36, associated with motor 13, is immediately increased through the action of the cumulative series field windings 41 and 44 thereby causing an increase in the voltage developed by generators 35 and 36. Simultaneously, therewith, the total excitation of generators 37 and 38, associated with the overloaded motor 14, is decreased in the same proportion through the action of the differential series field windings 46 and 49. As shown, the differential series field windings are two turn windings while the cumulative field windings are single turn windings thereby producing equal ampere turns in both sets of windings, since the cumulative field windings are subjected to full-load current, whereas the differential field windings are each subjected to one-half full load current, in this instance, and to a lesser amount if more than two generators are used. In the event that over or under compounding is desired on the generators the required relative proportions of ampere turns may be provided without in any way interfering with the operation of the drive.

The simultaneous voltage increase of generators 35 and 36 and voltage decrease of generators 37 and 38 tends to cause the motors 13 and 14 to change their speed simultaneously, the motor 13 being subjected to an increased voltage tends to increase its speed and assume its proportionate share of the load whereas the motor 14 tends to reduce its speed thereby dropping a portion of its load.

Only two generators for each motor have been shown, however, it is apparent that more than two may be utilized as the scheme of connections remains the same regardless of the number.

It will be readily understood that this scheme of connections provides an electric drive in which there is an inherent balancing force operating to maintain the complete system in the desired state of load and speed balance at all times because should either motor at any time tend to acquire more than its proportionate share of the load, the unbalance in the excitation of the system functions quickly and accurately to restore the system to the desired state of balance. This is true regardless of the speed at which the system is operating which is controlled by varying the voltage of the generators or the excitation of the motors or both, or the direction in which it is operating.

In Fig. 2 of the drawings, there is illustrated an electric drive embodying the principal features of my invention which is suitable for application to hoisting systems as well as to rolling mills and the like.

In this instance, there is shown a double drum hoist 65 having its separate drum elements 66 and 67 connected together by means of suitable clutches 68 and 69 so that the drums may be operated together or individually as desired. An example of individual operation would be where it was desired to readjust the relative lengths of the hoisting cables or where one hoist became inoperative for any reason.

In this embodiment of the invention, the motors 71 and 72 are of the shunt type having separately-excited field windings 73 and 74, which may be connected to an exciter 19 and controlled in the same manner as the system of Fig. 1.

The motors are supplied with power by means of generators 75 and 76 having separately-excited main field windings 77 and 78, differential series field windings 79 and 80 and cumulative series field windings 81 and 82, respectively. These generators may likewise be driven by means of a suitable motor 30.

The main field windings may be energized from a suitable source 51 through the reversing switches 52 and 53 which are controlled as in Fig. 1 by means of a controller 60. In this instance, the field windings are connected in parallel circuit relation to bus bars 83 through rheostats 84 and 85 and disconnecting switches 86 and 87 although they may be connected in series if desired.

As described hereinbefore in connection with Fig. 1, the motors are caused to maintain a predetermined load balance and speed relation by connecting the motors and generators in groups and interconnecting the groups through the cumulative series field windings.

In applications of this kind, it is desirable to provide for operating any group consisting of a generator and a motor individually of any other group in order that either one of the hoisting drums 66 and 67 may be moved relative to the other.

In order to accomplish this function, provision is made for entirely isolating one circuit from another which may be accomplished by means of suitable field shunting switches 88, 89, 90 and 91. When these switches are in their normal operating positions as shown, the normal interconnected circuit relations of the groups are maintained. However, when these switches are actuated to the opposite positions from that shown, all of the series field windings are open circuited and the generators connected into the system as shunt machines making it possible to operate either group independently of the other. The field switches 86 and 87 may be opened to render either group ineffective.

It is thus apparent that the grouping arrangement used in my electrical drive enables the number of generators, and consequently, the capacity of the system to be greatly increased over that of present day systems. At the present time, it is very difficult if not impossible to increase the number of generators in a system of this general type to more than four and possibly three is the present limit. In the system described hereinbefore, it is possible to use the limit of possibly four generators connected in parallel in each group thereby doubling the capacity of the system without in any way impairing its functioning to maintain predetermined load and speed ratios between the machines.

It is further apparent that the changes in the magnetic fields of the machines which are necessary to produce load division are faster in a system of this kind than it is possible to obtain in systems where series exciters are used. It is to be understood, however, that series exciters may be used in this system in connection with compounding field windings on the generators instead of the regular series field windings as illustrated.

Another advantage of the system of my invention is that the efficiency of the motors is increased and the design of the series or compounding field winding greatly simplified since only one series or compounding field winding at the most is necessary on each motor, it not being necessary to provide both a cumulative and a differential series or compounding field winding to maintain load and speed balance in a system of this kind. If the system is to be used for non-reversing service only regular series fields may be used on the motors to obtain any desired drooping speed characteristic.

It may be stated in conclusion that, while the illustrated example constitutes a practical embodiment of my invention, I do not wish to limit myself strictly to the exact details herein illustrated, since modifications of the same may be made without departing from the spirit of the invention, as defined in the appended claims.

I claim as my invention:

1. In combination, a plurality of motors connected to drive a common load, a plurality of generators for supplying power to the motors, said generators being provided with cumulative and differential series field windings, means for driving the generators, and means connecting a plurality of said generators as a group to each motor in loop circuit relation through the differential series field windings of said plurality of generators in parallel and the cumulative series field winding of the other generators in series, thereby to provide for maintaining predetermined load division between the generators in the groups and between the groups of generators and the motors.

2. A system for maintaining predetermined load and speed ratios between a plurality of motors connected to drive individual cooperating elements of a work device comprising a plurality of generators having opposed series field windings, means for driving the generators, and means electrically connecting a plurality of said generators in parallel to each motor in loop circuit relation, said loop circuits including a series field winding of each generator in series with its armature and a different series field winding of each of the other generators connected in series circuit relation in the loop circuits.

3. A system for maintaining predetermined load and speed ratios between a plurality of motors connected to drive individual cooperating elements of a work device comprising a plurality of generators having separately-excited main field windings and cumulative and differential series field windings, means for driving the generators, means for electrically connecting a plurality of said generators to each motor in loop circuit relation forming groups of parallel connected generators supplying power to each motor, said groups of generators being interconnected only through the cumulative series field windings of the other group connected in series circuit relation in the loop circuits, whereby any deviation in the respective loads of the motors inversely effects a change in the excitation of the generators of the groups.

4. In combination, a plurality of direct current motors subjected to a common load, a plurality of direct current generators for supplying variable voltage power to the motors, said generators being provided with separately-excited main field windings and cumulative and differential regulating field windings, means for driving the generators in unison, a plurality of said generators being connected in parallel for supplying power to each motor, each generator being connected in series with its differential regulating field winding and the group of generators in series with the cumulative field windings of the generators of another group of generators connected to another motor.

5. In combination, a plurality of direct current motors subjected to a common load, a plurality of direct current generators for supplying variable voltage power to the motors, said generators being provided with separately-excited main field windings and cumulative and differential regulating field windings, means for driving the generators in unison, means connecting a plurality of said generators in parallel in loop circuit relation with each motor, each loop circuit including the differential regulating field windings of the generators in series with their respective generators and the cumulative regulating field windings of the generators of another group in series to be subjected to the load current of the motor, said regulating field windings being so proportioned that the magnetizing effect produced by the plurality of differential fields in parallel is substantially neutralized by that produced by the cumulative field windings connected in series in another loop circuit when the motors are sharing a common load in a predetermined ratio.

6. In a system for maintaining predetermined load and speed ratios between motors driving separate elements of a work device which may be independently operated, comprising a generator for supplying power to each motor, said generators having cumulative and differential series field windings, each generator being connected to its motor through its own differential series field winding and the cumulative field winding of another generator, and means whereby the series field windings may be rendered ineffective to influence the excitation of the generators thereby to permit individual operation of any generator and motor.

7. In a system for maintaining predetermined load and speed ratios between motors driving separate elements of a work device which may be independently operated, comprising a generator for supplying power to each motor, said generators having cumulative and differential series field windings, each generator being connected to its motor through its own differential series field winding and the cumulative field winding of another generator, and switch means associated with each series field winding operable to shunt said field winding to permit individual operation of the generator and motor groups.

HAROLD E. STOKES.